June 29, 1948.  F. POSTMA  2,444,308
CRANK PIN TRUING DEVICE
Filed April 3, 1947  2 Sheets-Sheet 1
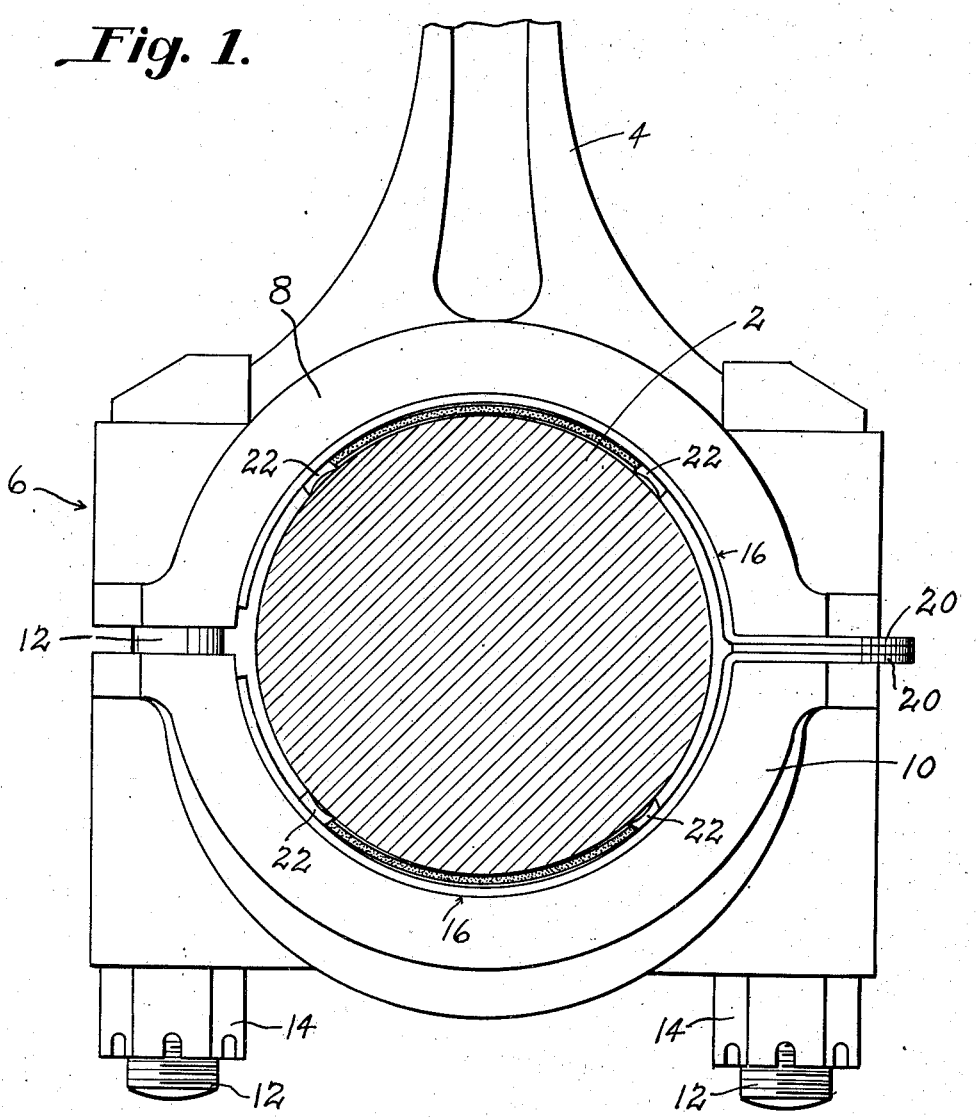
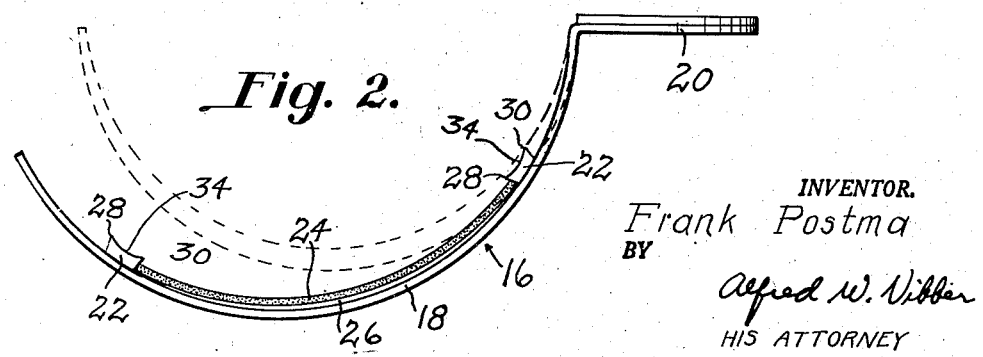
INVENTOR.
Frank Postma
BY
Alfred W. Vibber
HIS ATTORNEY June 29, 1948.　　　　　F. POSTMA　　　　　2,444,308
CRANK PIN TRUING DEVICE Filed April 3, 1947　　　　　　　　　　2 Sheets-Sheet 2

INVENTOR.
Frank Postma
BY
Alfred W. Vibber
HIS ATTORNEY

Patented June 29, 1948

2,444,308

UNITED STATES PATENT OFFICE 2,444,308

CRANKPIN TRUING DEVICE

Frank Postma, Paterson, N. J.

Application April 3, 1947, Serial No. 739,223

12 Claims. (Cl. 51—181)

This invention relates to devices for truing worn journals of crank shafts of internal combustion engines and the like without removing the crankshaft from the engine. The device of the invention affects such truing by a cutting operation which is particularly effective in removing ridges from the surface of the journal, whereby the bearing journal is quickly restored to a truly circular cylindrical shape. More particularly, the invention relates to an improved liner and liner assembly adapted to be substituted for the bearing liners of the engine connecting rod, such liner assembly carrying on its inner journal confronting surface at least one transverse cutting element which removes stock from the journal surface by a combined planing and turning operation.

The journal truing liner and liner assembly of the present invention display particular advantages in reshaping crankshaft crankpin journals which have both become out-of-round and have developed ridges therein. A typical example of such type of wearing of crankpins is found in automobile engines, the tendency toward wearing of the crankpins to out-of-round condition being caused by the periodical nature of the load on the bearing, and the ridges, particularly at the center of the journal, being caused by the presence of one or more oil grooves in the inner bearing surface, which cause the wear on the crankpin to be greater on each side of the oil groove than in the zone coinciding with such groove. The prior devices, which have relied solely upon abrasive liners carried within the connecting rod bearing halves, have been rather inefficient in the removing of such ridges from the crank pin. Obviously, in such case the abrading liner wears locally in the zone of the ridge, and thus but a small part of the liner is utilized, at least in the initial part of the truing operation. Besides being expensive, frequently requiring the successve use of several abrasive elements in the liners before the ridge is removed, such manner of treatment of the pins is quite slow, and thus the labor cost is high, especially where the ridges are of pronounced height.

It is an object of the invention to provide a cutting device for use in the bearing end of a connecting rod, the device being of such design that it quickly and efficiently removes the circumferential ridges from the pin by a metal cutting operation.

This and further objects of the invention will become more readily apparent in the following description of preferred embodiments thereof.

Briefly the journal truing liner assembly of the invention consists of the combination of removable liner elements fitting within the separable halves of a journal bearing. Such liner assembly is preferably made in two parts, one such part fitting within each separable part of the journal bearing housing. Each liner half preferably is provided with at least one transversely disposed cutting element located on the inner surface thereof, the cutting element or elements on each liner part being so located that the cutting elements are spaced an appreciable distance from each other when the liner parts are placed together to form the liner assembly. It is possible, however, within the scope of the invention, to position all the cutting elements of the liner assembly on one liner part, the other liner part acting as a guide and feeding pressure applying means.

In the embodiment presently preferred each liner is provided with two transverse cutting elements symmetrical about a central radial plane, the cutting elements being so spaced that they lie at substantially uniform intervals about the crankpin, the two liner parts being of identical configuration. Such construction is obviously economical, since both liner parts are the same, and is easy to use, since no attention need be given to the placing of a particular liner part in a given bearing half nor to the direction in which the crankshaft is to be rotated.

The invention will be more readily understood by reference to the accompanying drawing showing preferred embodiments of the liner and liner assembly of the invention in which:

Figure 1 is a view partially in side elevation and partially in section of the bearing end of a connecting rod of a crankshaft, and the crankpin with which it cooperates with the journal truing liner assembly of the invention in place;

Figure 2 is a view in edge elevation of one of the cutting liner elements employed in the liner assembly shown in Figure 1;

Figure 3:
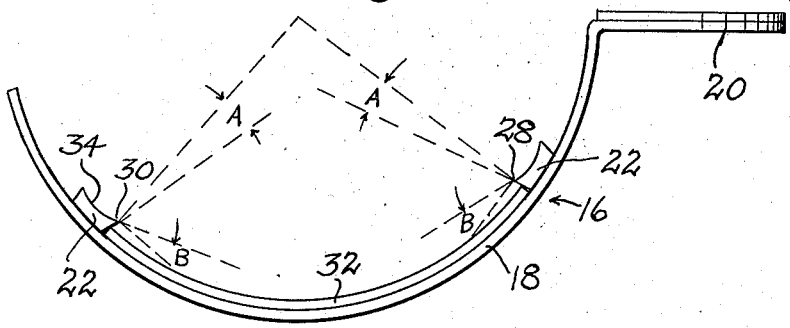
Figure 3 is a view in edge elevation of a second embodiment of such liner element.

Figure 1 shows the manner in which the journal truing liner, shown more particularly in Figure 2, is employed with another such liner to form a liner assembly in truing crankshaft journals. In Figure 1 the crankpin, shown in cross section, is designated by the reference character 2, a part of the connecting rod cooperating therewith being shown at 4. The crankpin bearing at the lower end of the connecting rod, shown generally at 6, has a top half 8 integral with the lower end of the connecting rod 4 and a separable lower half 10 in the form of a bearing cap. The cap is retained on the bearing by means of the vertical retaining bolts 12 extending through flanges on the outer edges of the bearing halves, the lower bearing cap being retained by means of nuts 14.

In use, a journal truing liner is substituted for the thin bearing lining in each bearing half. Since the top and bottom liners in Figure 1 are identical, the same reference characters are employed in designating the same parts of each. The liner as a whole, which is designated generally by the reference character 16, consists of a backing member or shell 18 of thin flexible metal, such shell being approximately semi-cylindrical in shape. One edge of such shell is provided with an integral shim 20, having a transverse slot (not shown) therethrough for the reception of the bolt 12, the other edge of the shell being devoid of a shim. The upper and lower liners are placed in the bearing as shown, so that the two integral shims 20 lie on one side thereof.

Each liner shell is provided, in the embodiment shown, with two cutting elements 22 so located as to lie at substantially equal distances from a vertical radial plane through the crankpin, the cutting elements also being so located that when the two liner elements are assembled as shown at Figure 1, each opposite pair of cutting elements lie substantially on the same radial plane.

The character of the cutting elements 22 will be more readily apparent by reference to Figure 2, which shows one of the liners employed in Figure 1, and to Figure 3, which shows a modified liner in which the cutting elements are, however, the same as those in Figures 1 and 2. In Figures 1, 2, and 3, cutting elements 22 are in the form of generally radially extending lands each having the transverse cutting edge 28, designated the front cutting edge, on the left hand side thereof, and the transverse cutting edge 30, designated the rear cutting edge, on the right hand side thereof. Each of such edges is provided with relief from the surface of the crankpin 2. In this instance, relief is provided by means of the hollow ground surface 34 which lies on a circle having a radius much smaller than that of the crankpin. The relief thus provided both the front and rear cutting edges is shown in Figure 3 as being measured by the angle B, between a line through each cutting edge normal to the radius and a line through such edge tangent to the upper surface of the cutting element that adjoins the cutting edge.

Each forward and rear cutting edge is provided with a substantial positive rake, the front cutting edges having such positive rake on one side of radial planes therethrough and the rear cutting edges having such positive rake on the other side of radial planes therethrough. The rake of both the front and rear cutting edges is shown in Figure 3 as both being equal to an angle A, which is measured between a radial plane through each cutting edge and a plane tangent with the forward face of the cutting element that adjoins such cutting edge.

As a result of such construction, that is, the making of the cutting elements symmetrical about a central radial plane, the liners may be inserted in the bearing in either the top or bottom bearing halves thereof, and the engine crankshaft may be rotated in either direction. When movement of the crankpin journal surface relative to the cutting elements on the liner shown in Figure 2 is toward the right front cutting edges 28, thus having a positive rake relative to the crankpin, cut into the crankpin and shaves or peels away the material in the ridges thereof by a cutting operation which is a combined planing and turning operation. When rotation of the crankshaft takes place in the opposite direction, which may sometimes be desired, rear cutting edges 30 then having a positive angle of rake relative to the crankpin function as the cutting edges in the same manner as previously described in connection with edges 28.

It is generally desirable to employ on each liner an element, preferably located between the cutting elements, which combines the functions of a guide and depth gauge. In the embodiment shown in Figures 1 and 2, such guide and depth gauge takes the form of a comparatively stiff coated abrasive element 24 which may consist, for example, of an arcuate piece of vulcanized fiber to which abrasive grain is secured by a cured adhesive. To make the inner surface of the abrasive element 24 conform more exactly to the contour of the crankpin, such element may be backed up by a spacer 26, which is thicker at its center than at its ends. Elements 24 and 26 are preferably held in position on the liner by being snapped into place between the cutting elements 22, the liner being shown in solid lines in Figure 2 as being flattened somewhat to receive elements 24 and 26, following which upon release of the liner the natural spring of the shell 18 restores it to the shape shown in dotted lines in that figure. When an abrasive coated element such as 24 is employed as the guide and depth gauge, it has the further advantage that it contributes a useful metal removing action, so that metal is removed, by the embodiment of the liner and liner assembly shown in Figures 1 and 2, by combined metal cutting and abrading operations.

The metal cutting elements 22 in the embodiment in Figures 1, 2, and 3 may be formed, separately from the shell 18, from hard metal such as tool steel or Carboloy, which may be brazed, soldered, or welded to the shell. The embodiment of the liner shown in Figure 3 is identical with that shown in Figures 1 and 2, with the exception that the guiding and depth gauging element, here shown at 32, is non-abrasive in character. Such element may conveniently be formed from a hard product such as vulcanized fiber, and may be retained in place between the cutting elements in the same manner as element 24.

Figure 4:
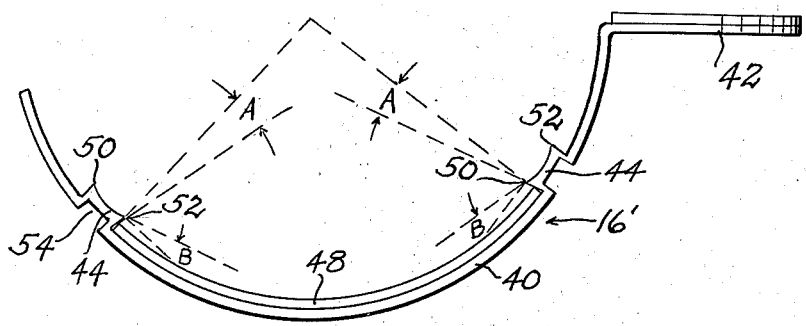
Figure 4 is a view of a further embodiment of the element.
Figure 5:
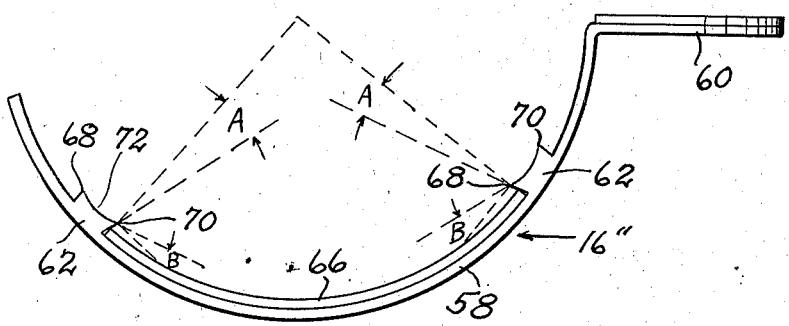
Figure 5 is a view in edge elevation of a fourth embodiment of the liner element of the invention.

Further embodiments of the liner of the invention are shown in Figures 4 and 5. In both these embodiments, a non-abrasive guiding and depth gauging member is employed, that in Figure 4 being designated 48 and that in Figure 5, 66. In Figure 4 the liner 16' has a shell 40, to one edge of which is affixed the integral shim 42. In this instance, the cutting elements 44 are integral with the shell 40, being punched up therefrom by an operation which leaves a depression 54 on the outer surface thereof. Such cutting elements 44 are provided with the front cutting edges 50 and the rear cutting edges 52, both of which have the same relief angle B, and the same rake angle A, as the cutting edges on the cutting elements of liners previously described. The shell in this embodiment is preferably formed of a steel having a somewhat higher carbon content than that employed in the previous embodiments, so that after the shim and the lands are formed, at least the lands may be hardened by a heat treating operation involving heating them above the critical temperature and quenching them.

In the embodiment shown in Figure 5, the cutting elements 62 are likewise formed integral with the shell 58 of the liner 16''. Such shell is also provided with an integral shim 60 on one edge thereof, the other edge being devoid of a shim. The cutting elements in this embodiment are formed by a machining operation, which reduces the gauge of the stock of the shell and shim in all portions thereof except the lands constituting the cutting elements. The machining operations including the hollow grinding to form the surface 72, and thus to define the front cutting edges 68 and the rear cutting edges 70, are conveniently completed before the shell is heat treated to harden it either over its full extent or at and including the cutting elements only.

After the above described ridges on the crankpin are removed from the crankpin journal by use of the cutting liner and liner assembly of the present invention, such liners are removed from the connecting rod bearing and are replaced by abrading liners such as that shown and described in my prior Patent No. 2,245,820, whereby the out-of-roundness of the journal is removed and the journal is given a finished polished surface.

Whereas I have described and illustrated preferred embodiments of the journal truing liner and journal truing liner assembly of the present invention, it will be understood that the invention is not to be limited thereto, since it is capable of considerable variation as to details.

I claim as new the following:

1. As a new article of manufacture a journal truing liner for engine crankshaft bearings, such bearings being formed in separable halves and having means for holding such halves together, said liner comprising an arcuate outer carrier shell of relatively thin flexible metal adapted to seat against the bore of a bearing half, said liner having at least one transverse cutting element on its inner surface intermediate its ends.

2. As a new article of manufacture, a journal truing liner for engine crankshaft bearings, such bearings being formed in separable halves and having means for holding such halves together, said liner comprising an arcuate outer carrier shell of relatively thin flexible metal adapted to seat against the bore of a bearing half, said liner having at least one transverse cutting element on its inner surface intermediate its ends, the cutting element being in the form of a land having at least one inner edge, such edge being a cutting edge and having relief from the surface of the journal, such cutting edge also having a positive rake on one side of a radial plane therethrough.

3. As a new article of manufacture, a journal truing liner for crankshaft bearings, such bearings being formed in separable halves and having means for holding such halves together, said liner comprising an arcuate outer carrier shell of relatively thin flexible metal adapted to seat against the bore of a bearing half, said liner having at least one transverse cutting element on its inner surface intermediate its ends, the cutting element being in the form of a land having two spaced inner edges, each such edge being a cutting edge and having relief from the surface of the journal, one cutting edge having a positive rake on one side of a radial plane therethrough and the other cutting edge having a positive rake on the other side of a radial plane therethrough.

4. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal adapted to seat against the bore of the bearing and having at least one transverse cutting element on the inner surface of each, the cutting elements being so located on the liners that when the liners are assembled they are spaced circumferentially of the bearing to an appreciable extent, each cutting element having at least one inwardly facing transverse cutting edge.

5. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal adapted to seat against the bore of the bearing, each such liner element having at least one transverse cutting element on its inner surface intermediate its ends, the cutting elements being so located on the individual liners that when the liners are assembled they are spaced circumferentially of the bearing to an appreciable extent, each cutting element being in the form of a land having at least one inner edge, such edge being a cutting edge and having relief from the surface of the journal, such cutting edge also having a positive rake on one side of a radial plane therethrough.

6. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal, each carrier shell adapted to seat against the bore of its respective half of the bearing, each shell having at least two circumferentially spaced transverse cutting elements on the inner surface thereof, the cutting elements being located on the two liners so that when the liners are assembled in operative position pairs of cutting elements on the assembly lie substantially opposite each other, each cutting element being in the form of a land having two spaced inner edges, each such edge being a cutting edge and having relief from the surface of the journal, one cutting edge having a positive rake on one side of a radial plane therethrough, and the other cutting edge having a positive rake on the other side of a radial plane therethrough.

7. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal, each carrier shell adapted to seat against the bore of its respective half of the bearing, each shell having at least two transverse cutting elements on the inner surface thereof, symmetrically located with respect to the center of the liner, the cutting elements being located on the two liners so that when the liners are assembled in operative position, pairs of cutting elements on the assembly lie substantially opposite each other on radial planes, each cutting element being in the form of a land having two spaced inner halves, each such half being a cutting edge and having a relief from the surface of the journal, one cutting edge having a positive rake on one side of a radial plane therethrough, and the other cutting edge having a positive rake on the other side of a radial plane therethrough.

8. As a new article of manufacture a journal truing liner for engine crankshaft bearings, such bearings being formed in separable halves and having means for holding such halves together, said liner assembly comprising an arcuate outer carrier shell of relatively thin flexible metal adapted to seat against the bore of one half of the bearing and having at least one transverse cutting element on its inner surface the cutting element having at least one inwardly facing transverse cutting edge, and a guiding and depth gauging element adapted to engage the surface of the crankpin, said last named element lying on the inner surface of the shell in proximity to the cutting element.

9. As a new article of manufacture a journal truing liner for engine crankshaft bearings, such bearings being formed in separable halves and having means for holding such halves together, said liner assembly comprising an arcuate outer carrier shell of relatively thin flexible metal adapted to seat against the bore of one half of the bearing and having at least two transverse cutting elements on its inner surface, the cutting elements being spaced circumferentially of the liners to an appreciable extent, each cutting element having at least one inwardly facing transverse cutting edge, and a guiding and depth gauging element adapted to engage the surface of the crankpin, said last named element lying on the inner surface of the shell between the cutting elements, the cutting edges of the latter elements projecting radially inwardly of the parts of the guiding and depth gauge element adjacent thereto.

10. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal adapted to seat against the bore of the bearing, each such liner element having at least one transverse cutting element on its inner surface intermediate its ends, the cutting elements being so located on the individual liners that when the liners are assembled they are spaced circumferentially of the bearing to an appreciable extent, each cutting element being in the form of a land having at least one inner edge, such edge being a cutting edge and having relief from the surface of the journal, such cutting edge also having a positive rake on one side of a radial plane therethrough, and a guiding and depth gauging element on each liner adapted to engage the surface of the crankpin, each of said last named elements lying on the inner surface of its shell in proximity to the cutting element on such shell.

11. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal, each carrier shell adapted to seat against the bore of its respective half of the bearing, each shell having at least two circumferentially spaced transverse cutting elements on the inner surface thereof, the cutting elements being so located on the individual liners that when the liners are assembled in operative position they are spaced circumferentially of the bearing to an appreciable extent and pairs of cutting elements on the assembly lie substantially opposite each other on radial planes, each cutting element being in the form of a land having two inner edges, each such edge being a cutting edge and having relief from the surface of the journal, one cutting edge having a positive rake on one side of a radial plane therethrough, and the other cutting edge having a positive rake on the other side of a radial plane therethrough, and a guiding and depth gauging element on each liner adapted to engage the surface of the crankpin, each of said last named elements lying on the inner surface of its shell between and in proximity to the cutting elements on such shell, the inner crankpin engaging surface of the guiding and depth gauging element being made up of abrasive grains.

12. As a new article of manufacture a journal truing liner assembly for engine crankshaft bearings, such bearings being formed in separable halves and having means for holding such halves together, said liner assembly comprising a pair of arcuate outer carrier shells of relatively thin flexible metal, each carrier shell adapted to seat against the bore of its respective half of the bearing, each shell having at least two circumferentially spaced transverse cutting elements on the inner surface thereof, the cutting elements being located on the two liners so that when the liners are assembled in operative position, pairs of cutting elements on the assembly lie substantially opposite each other on radial planes, each cutting element being in the form of a land having two spaced inner edges, each such edge being a cutting edge and having a relief from the surface of the journal, one cutting edge having a positive rake on one side of a radial plane therethrough, and the other cutting edge having a positive rake on the other side of a radial plane therethrough, and a guiding and depth gauging element having a smooth crankpin engaging inner surface on each liner, each of said last named elements lying on the inner surface of its shell between and in proximity to the cutting elements on such shell.

FRANK POSTMA.